(12) United States Patent
Koay et al.

(10) Patent No.: US 12,321,225 B2
(45) Date of Patent: *Jun. 3, 2025

(54) TECHNOLOGIES FOR RE-PROGRAMMABLE HARDWARE IN AUTONOMOUS VEHICLES

(71) Applicant: Intel Corporation, Santa Clara, CA (US)

(72) Inventors: Wei Yee Koay, Bayan Lepas (MY); Rita H. Wouhaybi, Portland, OR (US); Melissa M. Ortiz, San Jose, CA (US); Shahrnaz Azizi, Cupertino, CA (US); Gayathri Jeganmohan, Folsom, CA (US); Lady Nataly Pinilla Pico, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 159 days.

This patent is subject to a terminal disclaimer.

(21) Appl. No.: 18/171,116

(22) Filed: Feb. 17, 2023

(65) Prior Publication Data
US 2023/0281075 A1  Sep. 7, 2023

Related U.S. Application Data

(63) Continuation of application No. 17/479,511, filed on Sep. 20, 2021, now Pat. No. 11,586,492, which is a (Continued)

(51) Int. Cl.
*G06F 11/00* (2006.01)
*G05D 1/00* (2024.01)
(Continued)

(52) U.S. Cl.
CPC .......... *G06F 11/0793* (2013.01); *G06F 11/00* (2013.01); *G06F 11/0739* (2013.01);
(Continued)

(58) Field of Classification Search
CPC .. G06F 11/0793; G06F 11/00; G06F 11/0739; G06F 11/20; G06F 11/2289;
(Continued)

(56) References Cited

U.S. PATENT DOCUMENTS 8,682,509 B2   3/2014   Goodrich et al.
8,711,161 B1   4/2014   Scotzniovsky et al.
(Continued)

FOREIGN PATENT DOCUMENTS

EP      1476816 B1       7/2005
KR   1020080077175 A     8/2008
WO     2013102230 A1     7/2013

OTHER PUBLICATIONS

EPO; Office Action issued in EP Patent Application No. 19906193.8, dated Aug. 30, 2023; 5 pages.
(Continued)

*Primary Examiner* — Tiffany P Young
(74) *Attorney, Agent, or Firm* — Alliance IP, LLC

(57) ABSTRACT

Techniques are disclosed herein for reconfiguring reprogrammable hardware in an autonomous vehicle system. According to an embodiment, an autonomous driving system includes sensors and a configurable circuit having physical logic units. The autonomous driving system aggregates data observed from each of the sensors. The autonomous driving system detects a trigger indicative of a defect in the configurable circuit. The defect is identified as a function of the aggregated data. The autonomous driving system performs, in response to the trigger, a reconfiguration action on the configurable circuit to repair the defect.

20 Claims, 7 Drawing Sheets

Related U.S. Application Data continuation of application No. 16/233,901, filed on Dec. 27, 2018, now Pat. No. 11,126,496.

(51) Int. Cl.
  *G06F 11/07* (2006.01)
  *G06F 11/20* (2006.01)
  *G06F 11/22* (2006.01)
  *G07C 5/00* (2006.01)
  *G07C 5/08* (2006.01)

(52) U.S. Cl.
  CPC .......... *G06F 11/20* (2013.01); *G06F 11/2289* (2013.01); *G07C 5/0808* (2013.01); *G05D 1/0088* (2013.01); *G07C 5/008* (2013.01)

(58) Field of Classification Search
  CPC .... G07C 5/0808; G07C 5/008; G05D 1/0088; G05D 2201/0213
  USPC ........................................................ 701/29.7
  See application file for complete search history.

(56) References Cited

U.S. PATENT DOCUMENTS

| | | |
|---|---|---|
| 8,732,644 B1 | 5/2014 | Diamond |
| 2016/0378460 A1 | 12/2016 | Chiou et al. |
| 2017/0017556 A1* | 1/2017 | Zhou ................... G06F 11/0727 |
| 2018/0067810 A1 | 3/2018 | Li |
| 2019/0129789 A1 | 5/2019 | Koay et al. |

OTHER PUBLICATIONS

"ISO 26262-11:2018." ISO, https://www.iso.org/standard/69604.html. Accessed May 23, 2023, 179 pages.

PCT International Search Report and Written Opinion issued in PCT/US2019/062179, dated Mar. 10, 2020; 10 pages.

* cited by examiner

TECHNOLOGIES FOR RE-PROGRAMMABLE HARDWARE IN AUTONOMOUS VEHICLES

CROSS-REFERENCE TO RELATED APPLICATION

This application is a continuation (and claims the benefit of priority under 35 U.S.C. § 120) of U.S. patent application Ser. No. 17/479,511, filed Sep. 20, 2021, entitled "TECHNOLOGIES FOR RE-PROGRAMMABLE HARDWARE IN AUTONOMOUS VEHICLES", which is a continuation of U.S. patent application Ser. No. 16/233,901, filed Dec. 27, 2018, and entitled "TECHNOLOGIES FOR RE-PROGRAMMABLE HARDWARE IN AUTONOMOUS VEHICLES," the entirety of which application is incorporated by reference herein.

BACKGROUND

An autonomous vehicle is a vehicle that is capable of sensing a surrounding environment and navigating through the environment to reach a predetermined destination, typically without further input from a vehicle operator. To do so, the autonomous vehicle may include various sensors, such as lasers, radar, global positioning system (GPS), and computer vision technologies. A system configured with the autonomous vehicle may process sensor data to identify appropriate navigation paths, obstacles, and relevant signage.

The autonomous vehicle system may include an integrated circuit (IC) to provide various functions for normal operation of the autonomous vehicle, such as artificial intelligence (AI) and machine learning functions for decision and control logic in the vehicle. However, defects in the IC can arise over time (e.g., due to wear-and-tear of the autonomous vehicle system during normal operation of the vehicle). In addition, the functions programmed in the IC may have bugs and other issues (e.g., logic bugs, security issues, outdated features, etc.). As a result, system malfunctions in the autonomous vehicle system can occur and cause safety issues.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
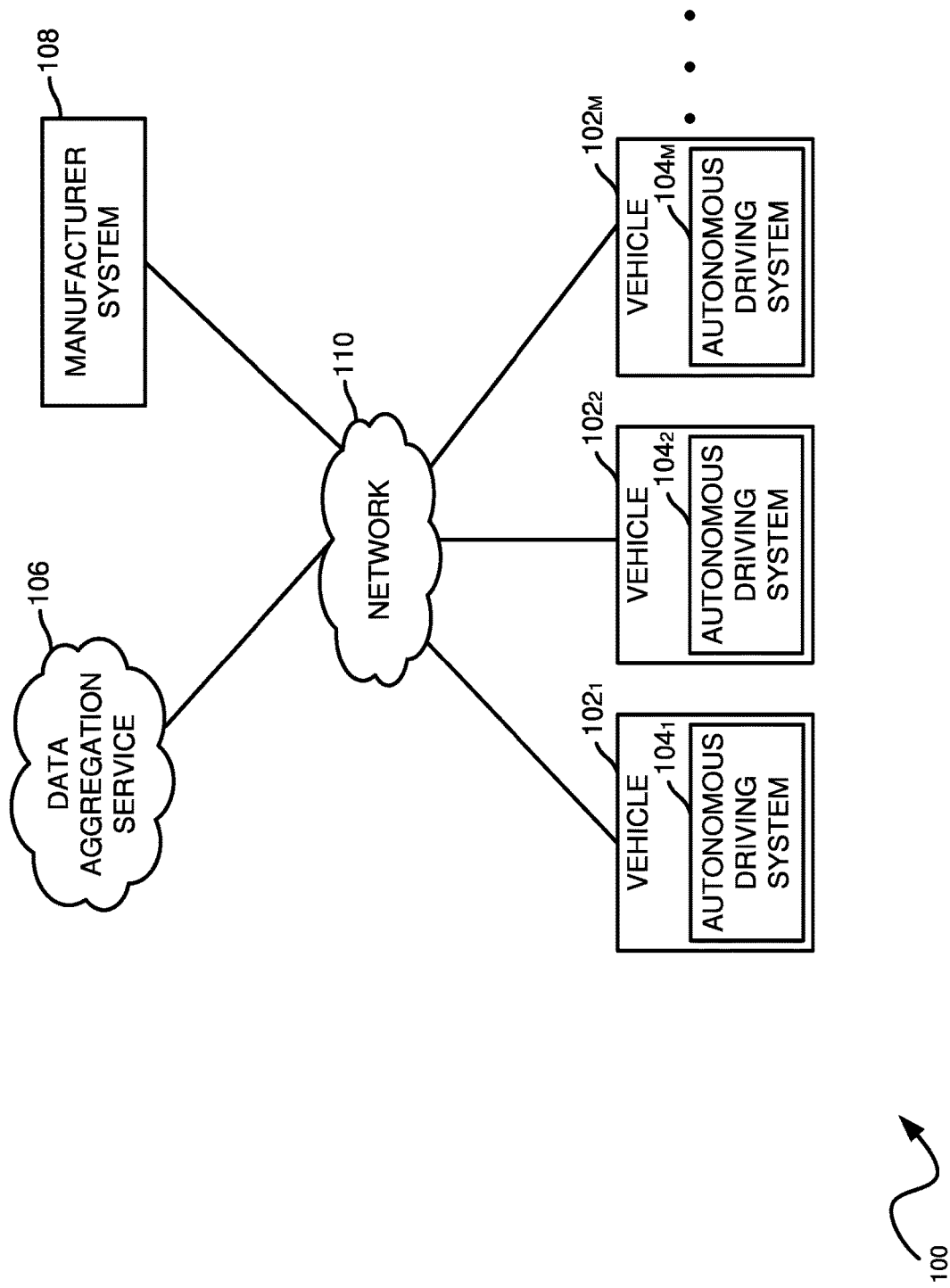
FIG. 1 is a simplified block diagram of an example computing environment in which an autonomous vehicle system is configured to update reprogrammable hardware as a function of multiple inputs.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a computing environment 100 which an autonomous vehicle system is configured to update reprogrammable hardware as a function of multiple inputs is shown. As shown, the computing environment 100 includes multiple vehicles $102_{1-M}$. In the illustrative embodiment, a vehicle 102 may be any type of autonomous or "driver-less" vehicle capable of transporting passengers. Further, in context of the embodiments described herein, the vehicles $102_{1-M}$ need not be fully autonomous, as one of skill in the art will recognize that the techniques of the present disclosure may also be adapted to partially autonomous vehicles.

As shown, each vehicle 102 includes an autonomous vehicle system 104. The autonomous vehicle system 104 provides decision and control logic to cause the vehicle to operate in an autonomous manner with little to no input from a human operator. For example, a given autonomous vehicle system 104 may obtain data from a variety of sensors within a vehicle 102 to determine a visible road geometry, objects (e.g., road signage, traffic posts, pedestrians, other vehicles, etc.) in view of one or more of the sensors, distance from such objects, and so on. Based, in part, on the obtained sensor data, the autonomous vehicle system 104 may determine actions to perform in operation, such as whether to maintain, increase, or reduce speed, change lanes, stop the vehicle, and so on.

Further, in an embodiment, each autonomous vehicle system $104_{1-M}$ may communicate, via a network 110 (e.g., the Internet), with a data aggregation service 106, e.g., that executes on a cloud network. The data aggregation service 106 may receive data sent by each of the vehicles autonomous vehicle systems $104_{1-M}$. Once received, the data aggregation service 106 may perform analytics that may be used for various purposes. For instance, the data aggregation service 106 may transmit analytics to a navigation service on the cloud network that may transmit relatively up-to-date navigation information (e.g., road conditions, traffic and congestion data, road signage, public safety warnings, navigation information sent by other vehicles, and the like) to the autonomous vehicle system 104. The autonomous vehicle system 104 may apply the navigation information to various components therein. For example, the autonomous vehicle system 104 may determine, based on information received from the navigation service, that traffic towards a specified destination is relatively congested on a given path, and control logic in the autonomous vehicle system 104 may determine a less congested path to the destination. Further still, in an embodiment, each autonomous vehicle system $104_{1-M}$ may communicate with servers associated with a manufacturer of the respective autonomous vehicle system $104_{1-M}$, such as manufacturer system 108. For example, a given autonomous vehicle system 104 may send data collected from on-board sensors to the manufacturer system 108. a.

Even further, in an embodiment, each autonomous vehicle system $104_{1-M}$ may communicate with other vehicles within proximity of the vehicle $102_{1-M}$, e.g., over a vehicular communications systems network. Such communications may include, for example, vehicle-to-vehicle (V2V) messages over a given frequency. The communications between vehicles may include safety warnings, traffic information, and lane change indications to prevent accidents and traffic congestion.

As further described herein, in an embodiment, each autonomous vehicle system $104_{1-M}$ includes a configurable circuit (e.g., a field-programmable gate array (FPGA)) that provides the decision-making and control functions for the autonomous vehicle system $104_{1-M}$. For example, the configurable circuit may include numerous physical logic units that can be encoded with bit stream data indicative of the functions. Because the configurable circuit is reprogrammable, if a defect to the circuit itself arises, then the autonomous vehicle system 104 may reprogram bit stream data originally located in defective physical units into physical logic units unaffected by the defect. In addition to repairing defects, the autonomous vehicle system 104 may reprogram the configurable circuit to correct functional bugs associated with the bit stream data (e.g., logic bugs, security bugs, security level issues, etc.). The autonomous vehicle system 104 may also reprogram the configuration circuit to include additional features, such as those pushed by the manufacturer to achieve compliance with new protocols or standards.

Even further, embodiments presented herein disclose techniques for using multiple inputs to determine instances in which to reprogram the configurable circuit to repair a defect identified in the circuit. An example input includes the data aggregation service 106. In particular, the data aggregation service 106 may determine, from aggregated data sent from the vehicles $102_{1-M}$, multiple insights about the vehicles as an aggregate. For example, vehicles 102 that travel similar routes likely experience similar driving conditions, e.g., with respect to roads, weather, and the like. A sudden increase in wear-and-tear conditions, reflected in aggregated sensor data from the vehicles 102, may be indicative of the roads being traveled may require repair. Further, by aggregating the data, anonymity can be provided for each of the vehicles 102 sending the sensor data. Further still, a given vehicle may opt-out of sharing data with the data aggregation service 106 (e.g., in the event that the vehicle travels remote roads used by a limited amount of people). The data aggregation service 106 may push such analytics to, e.g., the manufacturer system 108, which in turn may create updates or patches for the configurable circuit in a vehicle 102 to address wear and tear conditions (or patches to address functional bugs in the configurable circuit). In addition, the autonomous vehicle system 104 may also send aggregated sensor data to the manufacturer system 108, which may determine, if abnormalities in the sensor data exists, that a patch or update should be applied to the vehicle 102.

Figure 2:
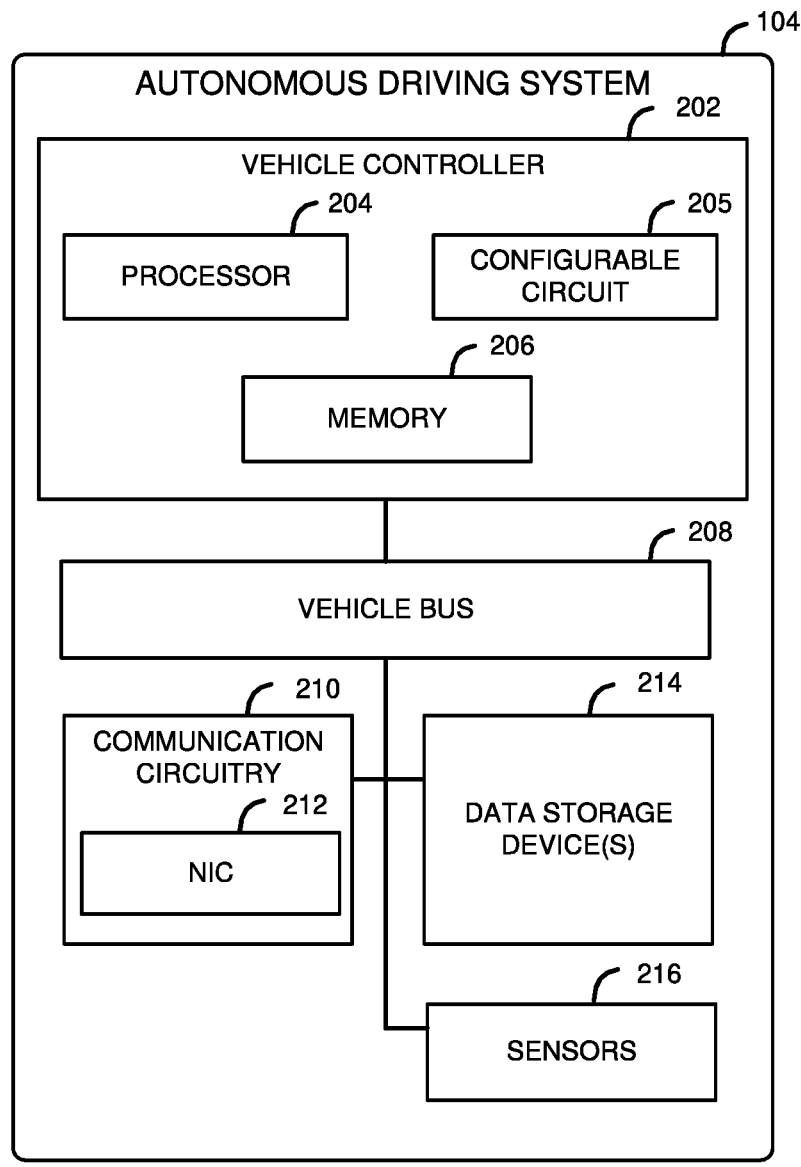
FIG. 2 is a simplified block diagram of at least one embodiment of the autonomous vehicle system described relative to FIG. 1.

Referring now to FIG. 2, the autonomous vehicle system 104 may be embodied as any type of device performing the functions described herein, such as aggregating data observed from sensors, detecting a trigger indicative of a defect in a configurable circuit, and performing a reconfiguration action on the configurable circuit in response to the trigger.

As shown, the illustrative autonomous vehicle system 104 includes a compute engine 202, an input/output (I/O) subsystem 208, communication circuitry 210, data storage devices 214, and sensors 216. Of course, in other embodiments, the autonomous vehicle system 104 may include other or additional components, such as those commonly found in a computer (e.g., display, peripheral devices, etc.). Additionally, in some embodiments, one or more of the illustrative components may be incorporated in, or otherwise form a portion of, another component.

The compute engine 202 may be embodied as any type of device or collection of devices capable of performing various compute functions described below. In some embodiments, the compute engine 202 may be embodied as a single device such as an integrated circuit, an embedded system, a field programmable gate array (FPGA), a system-on-a-chip (SOC), or other integrated system or device. Additionally, in some embodiments, the compute engine 202 includes or is embodied as a processor 204, a configurable circuit 205, and a memory 206. The processor 204 may be embodied as one or more processors, each processor being a type capable of performing the functions described herein. For example, the processor 204 may be embodied as a single or multi-core processor(s), a microcontroller, or other processor or processing/controlling circuit. In some embodiments, the processor 204 may be embodied as, include, or be coupled to an FPGA, an ASIC, reconfigurable hardware or hardware circuitry, or other specialized hardware to facilitate performance of the functions described herein.

In the illustrative embodiment, the processor 204 includes a control logic unit 205, which may be embodied as any type of hardware (e.g., a co-processor, an integrated circuit, etc.) or software used to determine and carry out courses of action for an underlying vehicle 102 (e.g., on which the autonomous vehicle system 104 is configured), e.g., as part of a platoon formed in response to detecting an emergency situation. The control logic unit 205 may communicate with one or more of the sensors 216 via the vehicle bus 208 to retrieve data regarding operation of the underlying vehicle 102.

The configurable circuit 205 may be embodied as any type of reprogrammable hardware or circuitry capable of performing the functions described herein. For example, the configurable circuit 205 may be embodied as a FPGA that has a modular lookup table structure and a number of physical logic units that can be used to encode bit stream data indicative of functions used to drive decision and control logic within the vehicle 102. For example, the physical logic units of the configuration circuit 205 may encode artificial intelligence (AI) and machine learning-based functions used in such decision and control logic.

The memory 206 may be embodied as any type of volatile (e.g., dynamic random access memory, etc.) or non-volatile memory (e.g., byte addressable memory) or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the memory 206 may be integrated into the processor 204.

The compute engine 202 is communicatively coupled with other components of the autonomous vehicle system 104 via the vehicle bus 208, which may be embodied as circuitry and/or components to facilitate input/output operations with the compute engine 202 (e.g., with the processor 204 and/or the memory 206) and other components of the autonomous vehicle system 104, such as the sensors 216. For example, the vehicle bus 208 may be embodied as, or otherwise include, a controller area network (CAN) bus, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the vehicle bus 208 may form a portion of a system-on-a-chip (SoC) and be incorporated, along with one or more of the processor 204, the memory 206, and other components of the autonomous vehicle system 104, into the compute engine 202.

The communication circuitry 210 may be embodied as any communication circuit, device, or collection thereof, capable of enabling communications over a network between the autonomous vehicle system 104 and other devices (e.g., autonomous vehicle systems 104 in other vehicles 102). The communication circuitry 210 may be configured to use any one or more communication technology (e.g., wired, wireless, and/or cellular communications) and associated protocols (e.g., Ethernet, Bluetooth®, Wi-Fi®, WiMAX, 5G-based protocols, etc.) to effect such communication.

The illustrative communication circuitry 210 includes a network interface controller (NIC) 212, which may also be referred to as a host fabric interface (HFI). The NIC 212 may be embodied as one or more add-in-boards, daughtercards, controller chips, chipsets, or other devices that may be used by the autonomous vehicle system 104 for network communications with remote devices. For example, the NIC 212 may be embodied as an expansion card coupled to the vehicle bus 208 over an expansion bus such as PCI Express.

The one or more illustrative data storage devices 214 may be embodied as any type of devices configured for short-term or long-term storage of data such as, for example, memory devices and circuits, memory cards, hard disk drives (HDDs), solid-state drives (SSDs), or other data storage devices. Each data storage device 214 may include a system partition that stores data and firmware code for the data storage device 214. Each data storage device 214 may also include an operating system partition that stores data files and executables for an operating system.

The one or more illustrative sensors 216 may be embodied as any type of devices configured to provide data regarding the surroundings and interior of the associated vehicle 102 so that logic in the autonomous vehicle system 104 (e.g., the control logic unit 205) may carry out actions responsive to the data (e.g., whether to accelerate the vehicle 102 or come to a stop). For example, the sensors 216 can include a global positioning system (GPS), cameras, radar, lasers, speedometers, angular rate sensors, computer vision sensors, and so on. The sensors 216 may communicate data to any other component within the autonomous vehicle system 104 via the vehicle bus 208.

Additionally or alternatively, the autonomous vehicle system 104 may include one or more peripheral devices. Such peripheral devices may include any type of peripheral device commonly found in a compute device such as a display, speakers, a mouse, a keyboard, and/or other input/output devices, interface devices, and/or other peripheral devices.

Further, as described above, the autonomous vehicle system 104 is illustratively in communication via the network 110, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

Figure 3:
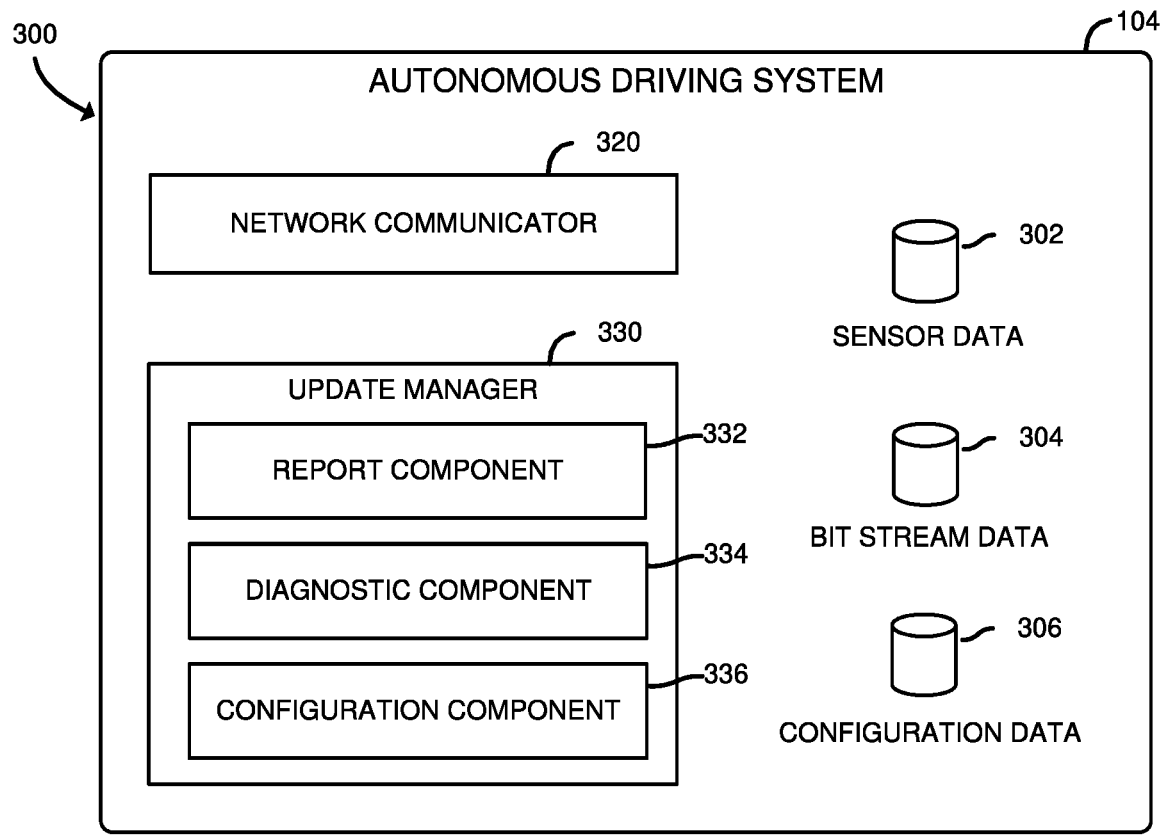
FIG. 3 is a simplified block diagram of at least one embodiment of an environment that may be established by the autonomous vehicle system of FIG. 1.

Referring now to FIG. 3, each autonomous driving system 104 may establish an environment 300 in operation. The illustrative environment 300 includes a network communicator 320 and an update manager 330. Each of the components of the environment 300 may be embodied as hardware, firmware, software, or a combination thereof. Further, in some embodiments, one or more of the components of the environment 300 may be embodied as circuitry or a collection of electrical devices (e.g., network communicator circuitry 320, update manager 330, etc.). It should be appreciated that, in such embodiments, one or more of the network communicator circuitry 320 and update manager circuitry 330 may form a portion of one or more of the NIC 212, compute engine 202, the communication circuitry 210, the vehicle bus 208, data storage devices 214, sensors 216, and/or other components of the autonomous driving system 104.

In the illustrative embodiment, the environment 300 includes sensor data 302, which may be embodied as any data collected from the sensors 216. The sensor data 302 may be organized in various formats, such as a separate data structure storing values for a given sensor 216. Further, the sensor data 302 may be aggregated into a file or multiple files for transmission to a service, such as the data aggregation service 106 or a service executing on the manufacturer system 108. Further, in the illustrative embodiment, the environment 300 also includes bit stream data 304, which may be embodied as any data that is indicative of one or more predefined functions executable by the configurable circuit 205. Further still, in the illustrative embodiment, the environment 300 also includes configuration data 306, which may be embodied as any data indicative of parameters used by the autonomous driving system 104 in aggregating the sensor data 302 for transmission to one or more services and in repairing defects in the configurable circuit. For instance, the configuration data 306 may specify permissions for which of the sensor data 302 should be sent to a given service (e.g., the data aggregation service 106). In such an example, the configuration data 306 may allow a service to obtain sensor data 302 relating to odometer and inertial management unit (IMU) data but decline to provide sensor data 302 relating to GPS data.

The network communicator 320, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from other devices, such as from an autonomous vehicle system 104 in a given vehicle 102. To do so, the network communicator 320 is configured to receive and process data packets from one system or computing device and to prepare and send data packets to another computing device or system. Accordingly, in some embodiments, at least a portion of the functionality of the network communicator 320 may be performed by the communication circuitry 210, and, in the illustrative embodiment, by the NIC 212.

The illustrative update manager 330, which may be embodied as hardware, firmware, software, virtualized hardware, emulated architecture, and/or a combination thereof as discussed above, is configured to aggregate sensor data 302 and to repair defects in the autonomous vehicle system 104. To do so, the update manager 330 includes a report component 332, diagnostic component 334, and a configuration component 336.

The report component 332 is configured to aggregate sensor data 302 (according to the configuration 306) and transmit the aggregated sensor data 302 to one or more services. To do so, the report component 332 may communicate with the vehicle bus 208 to obtain the sensor data 302 from the sensors 216. The report component 332 may format the sensor data 302 according to the permissions for the service specified in the configuration 306. The report component 332 may send the formatted data 302 to the service. Doing so allows the service to gain insights on the sensor data for use in, e.g., identifying infrastructure needs (e.g., whether a road is in need of repair), urban planning (e.g., whether a certain region should be expanded), promoting community development (e.g., identifying areas that could benefit from implementing ride sharing measures), and identifying defects in the vehicle 102 (e.g., by identifying abnormalities in the sensor data 302, such as values that deviate from an expected range for a given sensor 216).

The diagnostic component 334 is to receive a firmware update or patch data from a given service (e.g., the manufacturer system 108) in response to a determination that a defect is identified based on the transmitted sensor data 302. The defect may be indicative of a corrupted or otherwise unusable physical logic unit in the configurable circuit 205. In other cases, the defect may be indicative of a firmware bug in the function itself. The autonomous driving system 104 may apply the patch data to repair the defect in the configurable circuit 205. Further, the diagnostic component 334 is also configured to perform a self-diagnostics test on the sensor data 302. For example, the diagnostic component 334 may identify deviations in expected values in the sensor data 302. The diagnostic component 334 may thereafter correlate the deviations to a given function encoded in the configurable circuit 205 and identify which physical logic units are encoded with the function.

The configuration component 336 is configured to reprogram the configurable circuit 205 in response to a trigger that a defect in the configurable circuit is identified. A trigger may include the receipt of a patch or update from a given service or an identification of a defect by a self-diagnostics test on the aggregated sensor data 302. To repair a defect in the configurable circuit 205, the configuration component 336 may identify physical logic units affected by the defect (e.g., identify which of the functions are associated with the defect) and reprogram bit stream data 304 associated with the function to other physical logic units unaffected by the defect. Doing so allows the functions to be reprogrammed and avoid using, e.g., defective transistors in the configurable circuit 205.

It should be appreciated that each of the network communicator 320 and components in the update manager 330 may be separately embodied as hardware, firmware, software, virtualized hardware, emulated architecture, and/or a combination thereof. For example, the network communicator 330 and configuration component 336 may be embodied as hardware components, while the report component 332 and diagnostic component 334 are embodied as virtualized hardware components or as some other combination of hardware, firmware, software, virtualized hardware, emulated architecture, and/or a combination thereof.

Figure 4:
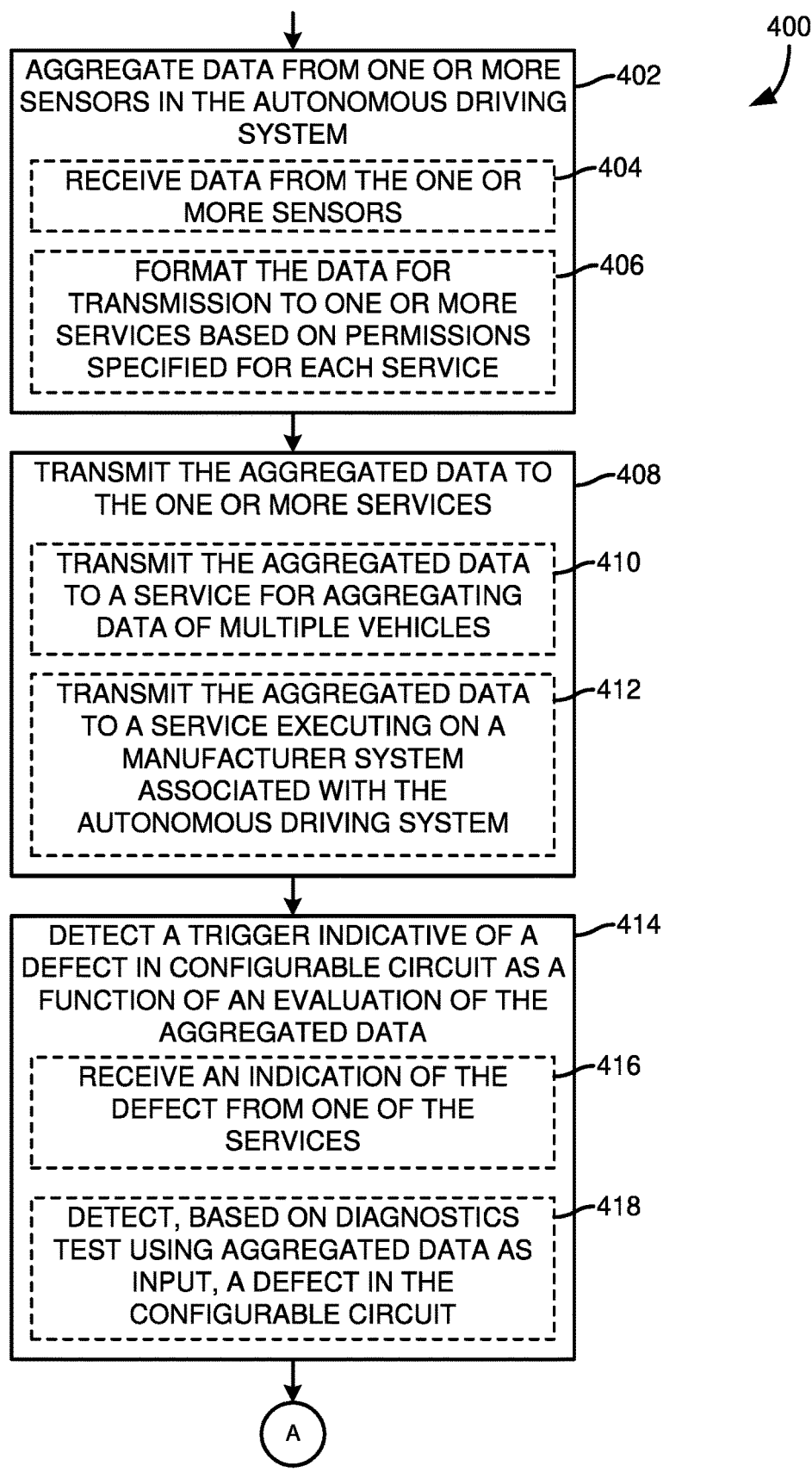
FIGS. 4 and 5 are simplified flow diagrams of at least one embodiment of a method for repairing a configurable circuit in the autonomous vehicle system of FIG. 1.
Figure 5:
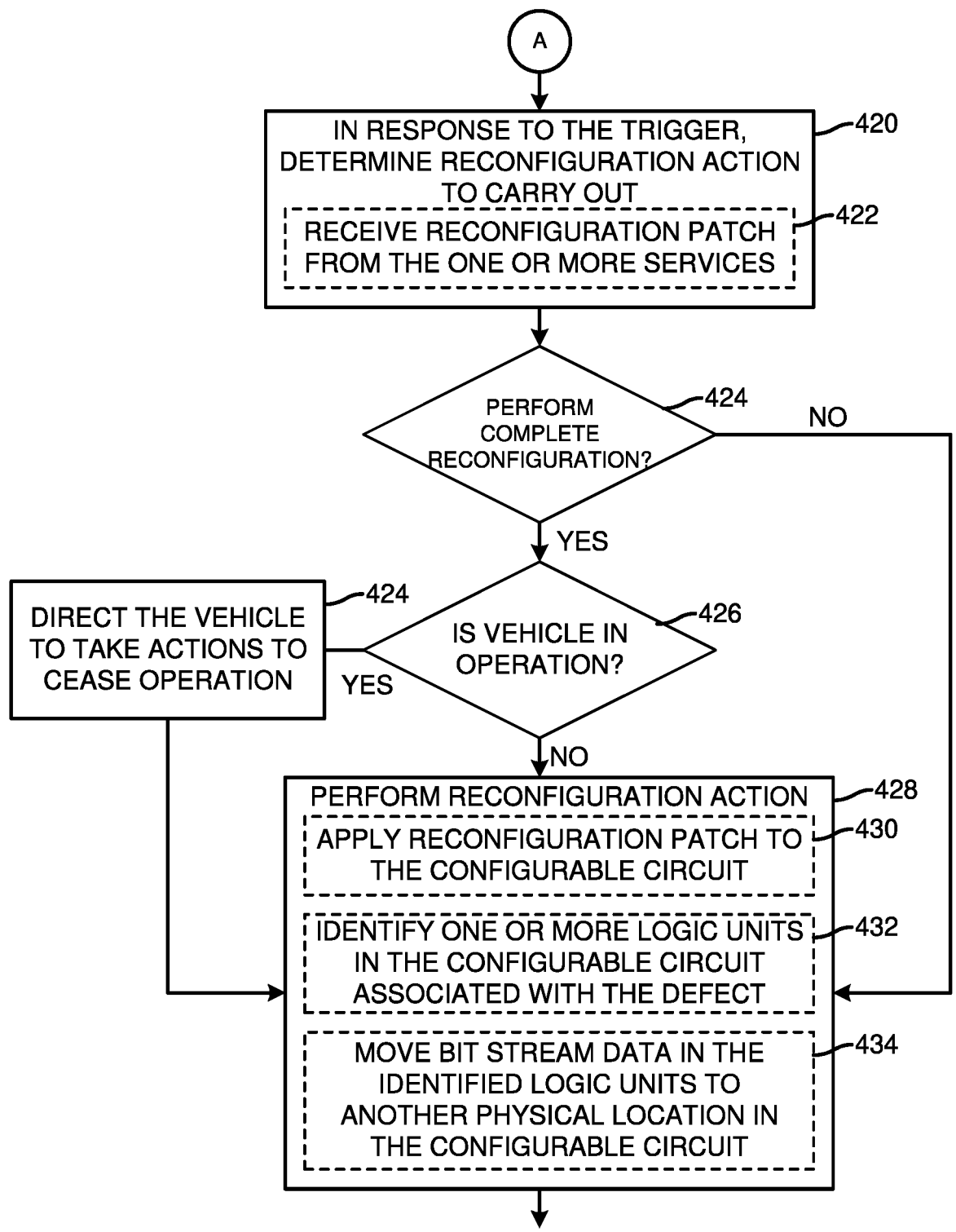

Referring now to FIGS. 4 and 5, each autonomous driving system 104, in operation, may perform a method 400 for repairing a configurable circuit. As shown, the method 400 begins in block 402, in which the autonomous driving system 104 aggregates data from one or more sensors 216. For instance, to do so, in block 404, the autonomous driving system 104 may communicate with the sensors 216 via the vehicle bus 208 to obtain the sensor data. In block 406, the autonomous driving system 104 formats the data for transmission to one or more services based on permissions specified for each service. Particularly, the autonomous driving system 104 may select which sensor data (e.g., based on the configuration 306) to send to the service.

In block 408, the autonomous driving system 104 may transmit the aggregated data to the one or more services. For instance, to do so, the autonomous driving system 104 may invoke an application programming interface (API) function associated with the service to package. As an example, in block 410, the autonomous driving system 104 transmits the aggregated data to the data aggregation service 106. The data aggregation service 106 may aggregate data shared by the vehicle 102 and other vehicles 102 in the computing environment 100 to determine various analytics, as described herein. As another example, in block 412, the autonomous driving system 104 transmits the aggregated data to a service executing on the manufacturer system 108. The manufacturer system 108 may perform a variety of diagnostics tests using the aggregated data as input to identify, e.g., defects in the configurable circuit 205, such as defects in the transistors of the configurable circuit 205 or functional bugs associated with bit stream data programmed in the configurable circuit 205.

In block 414, the autonomous driving system 104 detects a trigger indicative of a defect in the configurable circuit 205 as a function of an evaluation of the aggregated data. For example, in block 416, the autonomous driving system 105 receives an indication of the defect in the configurable circuit 205 from one of the services. For example, the manufacturer system 108 may identify anomalous activity in GPS sensors affecting routing decisions made by the autonomous driving system 104. The manufacturer system 108 may notify the autonomous driving system 104, e.g., by sending a message indicative of the defect in the configurable circuit 205. The message may include a description of the defect and a patch to be applied to the configurable circuit 205. As another example, the autonomous driving system 104 may detect, based on a self-diagnostics test using the aggregated data as input, the defect in the configurable circuit 205.

Continuing onto FIG. 5, in block 420, the autonomous driving system 104 determines, in response to the trigger, a reconfiguration action to carry out. For instance, in the example of a service detecting the defect, in block 422, the autonomous driving system 104 receives a reconfiguration patch from the one or more services. The autonomous driving system 104 may validate the reconfiguration patch prior to applying the patch.

Further, in block 424, the autonomous driving system 104 determines whether to perform a complete reconfiguration of the configurable circuit 205. A complete reconfiguration may involve relatively significant reprogramming of the configurable circuit 205. For instance, a reconfiguration that may affect the vehicle during operation may be a complete reconfiguration. As a result, it may be desirable to ensure that the vehicle is stopped and in a safe position when the reconfiguration takes place. Otherwise, the autonomous driving system 104 can perform a partial reconfiguration in which the configurable circuit 205 may be reprogrammed without interruption to operation of the vehicle. In such a case, the method 400 proceeds to block 428, in which the autonomous driving system 104 performs the reconfiguration action, which will be further described. If the autonomous driving system 104 determines to perform a complete reconfiguration, then the autonomous driving system 104 determines whether the autonomous vehicle 102 is in operation. If so, then in block 424, the autonomous driving system 104 directs the vehicle 102 to take actions to cease operation of the vehicle. For example, the autonomous driving system 104 may direct the vehicle 102 to park in a suitable area (e.g., a parking space) and come to a complete stop. The autonomous driving system 104 may then initiate a restart process to reprogram the configurable circuit 205 at boot up of the autonomous driving system 104.

In block 428, the autonomous driving system 104 performs the reconfiguration action. For example, in block 430, the autonomous driving system 104 applies the reconfiguration patch to reprogram physical logic units in the configurable circuit 205. The reconfiguration patch may include bit stream data to correct a bug and/or instructions to reprogram a given bit function to another physical location in the configurable circuit 205. As another example, in block 432, the autonomous driving system 104 identifies one or more physical logic units in the configurable circuit 205 in the configurable circuit 205 associated with the defect. In block 434, the autonomous driving system 104 moves the bit stream data associated with the defect to other physical logic units in the configurable circuit 205 that are unaffected by the defect. In the event that the defect relates to a bug in the function, the autonomous driving system 104 may overwrite the function using the patch data.

Figure 6:
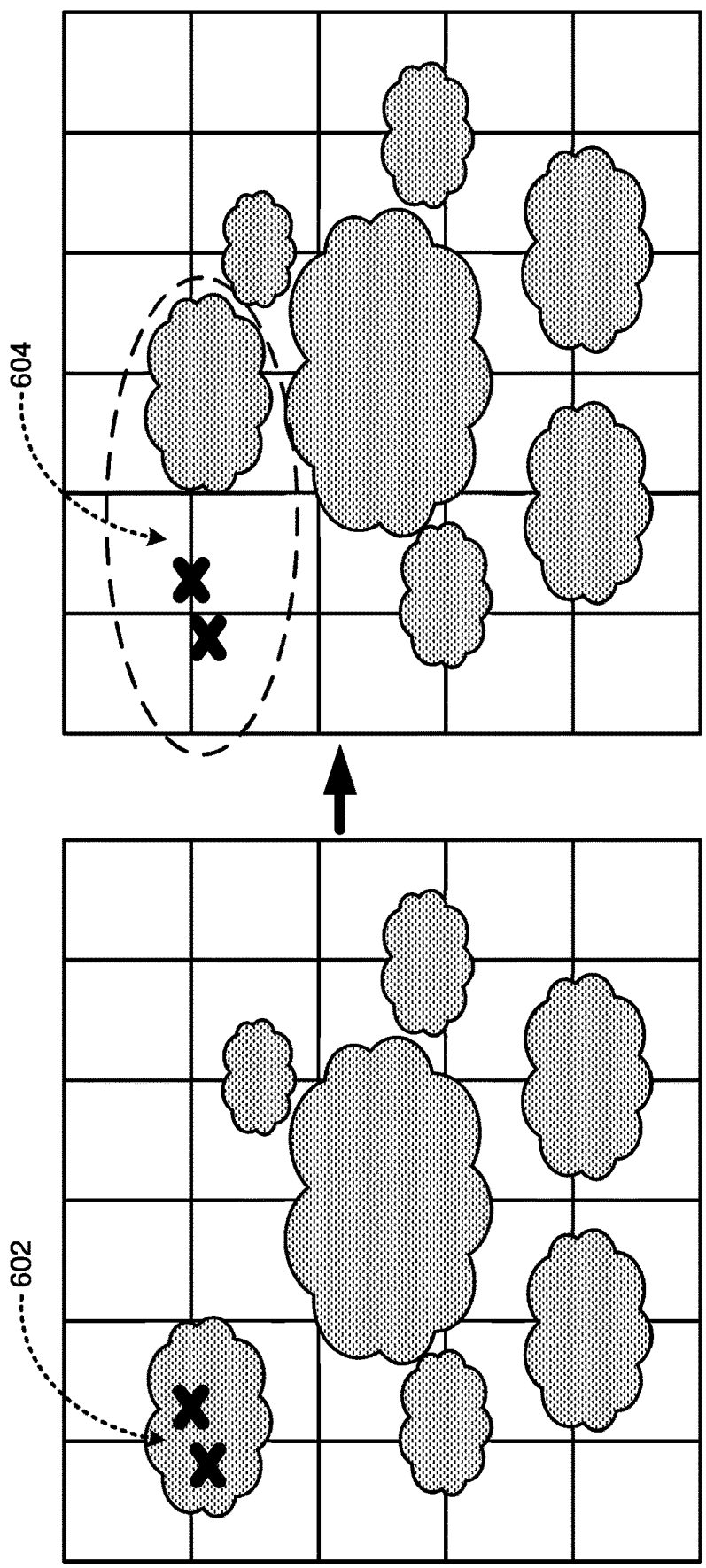
FIG. 6 is a simplified conceptual diagram of at least one embodiment of an example for repairing a defect in a configurable circuit.
Figure 7:
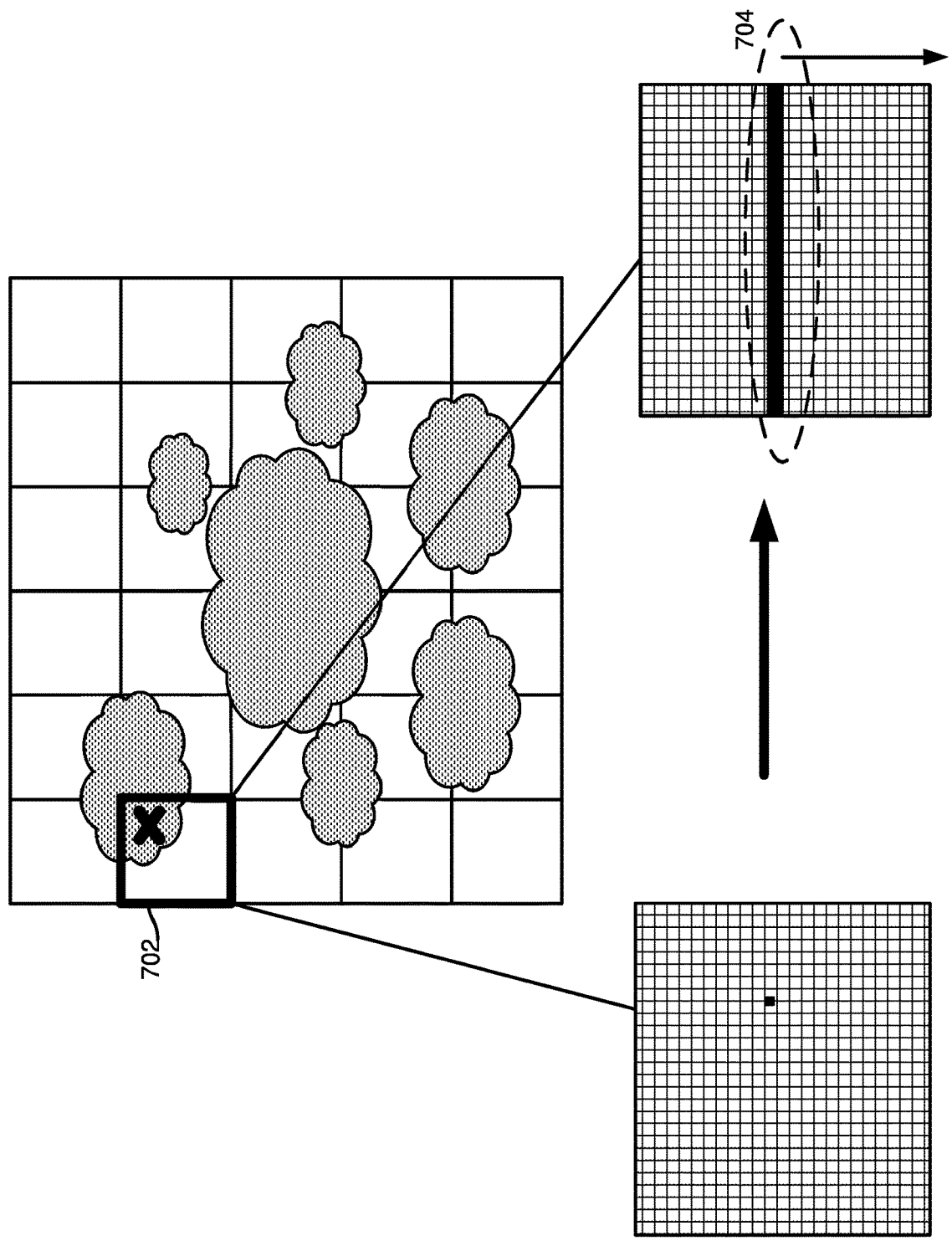
FIG. 7 is a simplified conceptual diagram of at least one embodiment of another example for repairing a defect in a configurable circuit.

Examples of repairing defects in the configurable circuit 205 are described relative to FIGS. 6 and 7. For instance, FIG. 6 depicts an example conceptualization of physical logic units (as squares in a grid) inside the configurable circuit 205. The darker portions within some of the physical logic units are indicative of bit stream data encoded therein. Cross marks over the encoding, as shown in 602, are representative of a defect in the physical logic units. In this example, the autonomous driving system may reprogram the configurable circuit 205 such that the bit stream data is located in another physical location of the configurable circuit, as depicted in 604.

As another example, FIG. 7 depicts another example conceptualization of physical logic units. In particular, FIG. 7 shows exploded views of a physical logic unit 702, in sequence relative to the repair of the configurable circuit 205. In the left-hand exploded diagram, a hardware defect in the configurable circuit 205 is depicted as a black dot. To address the defect, the autonomous driving system 104 may mark a row affected by the defect as unusable and shift the bit stream data originally at that row and the remaining data below that row another row down, as depicted in 704.

EXAMPLES

Illustrative examples of the technologies disclosed herein are provided below. An embodiment of the technologies may include any one or more, and any combination of, the examples described below.

Example 1 includes an apparatus that includes a vehicle controller having a configurable circuit having a plurality of physical logic units, the vehicle controller to aggregate data observed from each of a plurality of sensors; detect a trigger indicative of a defect in the configurable circuit, the defect identified as a function of the aggregated data; and perform, in response to the trigger, a reconfiguration action on the configurable circuit to repair the defect.

Example 2 includes the subject matter of Example 1, and wherein to aggregate the data observed from each of the plurality of sensors comprises to receive data from each of the one or more sensors; and format the data for transmission to one or more services.

Example 3 includes the subject matter of any of Examples 1 and 2, and wherein to format the data for transmission to one or more services comprises to format the data for transmission to a service, the data being formatted based on permissions specified for the service.

Example 4 includes the subject matter of any of Examples 1-3, and wherein the vehicle controller is further to transmit the aggregated data to the one or more services.

Example 5 includes the subject matter of any of Examples 1-4, and wherein to transmit the aggregated data comprises to transmit the aggregated data to a service for aggregating the data with data of a plurality of vehicles.

Example 6 includes the subject matter of any of Examples 1-5, and wherein to transmit the aggregated data comprises to transmit the aggregated data to a service executing on a server of a manufacturer of the apparatus.

Example 7 includes the subject matter of any of Examples 1-6, and wherein to detect the trigger indicative of the defect in the configurable circuit comprises to receive an indication of the defect from one of the one or more services.

Example 8 includes the subject matter of any of Examples 1-7, and wherein to detect the trigger indicative of the defect in the configurable circuit comprises to detect, based on a self-diagnostics test using the aggregated data as input, the defect in the configurable circuit.

Example 9 includes the subject matter of any of Examples 1-8, and wherein the vehicle controller is further to determine whether to perform a complete reconfiguration action or a partial reconfiguration action.

Example 10 includes the subject matter of any of Examples 1-9, and wherein to perform the reconfiguration action comprises to identify a first of the physical logic units associated with the defect, the first physical logic unit being programmed with bitstream data; and reprogramming the bitstream data into a second of the physical logic units different from the first physical logic unit.

Example 11 includes one or more machine-readable storage media comprising a plurality of instructions, which, when executed, causes a vehicle controller having a configurable circuit including a plurality of physical logic units to aggregate data observed from each of a plurality of sensors in the vehicle controller; detect a trigger indicative of a defect in the configurable circuit, the defect identified as a function of the aggregated data; and perform, in response to the trigger, a reconfiguration action on the configurable circuit to repair the defect.

Example 12 includes the subject matter of Example 11, and wherein to aggregate the data observed from each of the plurality of sensors comprises to receive data from each of the one or more sensors; and format the data for transmission to one or more services.

Example 13 includes the subject matter of any of Examples 11 and 12, and wherein to format the data for transmission to one or more services comprises to format the data for transmission to a service, the data being formatted based on permissions specified for the service.

Example 14 includes the subject matter of any of Examples 11-13, and wherein the plurality of instructions further causes the vehicle controller to transmit the aggregated data to the one or more services.

Example 15 includes the subject matter of any of Examples 11-14, and wherein to transmit the aggregated data comprises to transmit the aggregated data to a service for aggregating the data with data of a plurality of vehicles.

Example 16 includes the subject matter of any of Examples 11-15, and wherein to transmit the aggregated data comprises to transmit the aggregated data to a service executing on a server of a manufacturer of the apparatus.

Example 17 includes the subject matter of any of Examples 11-16, and wherein to detect the trigger indicative of the defect in the configurable circuit comprises to receive an indication of the defect from one of the one or more services.

Example 18 includes the subject matter of any of Examples 11-17, and wherein to detect the trigger indicative of the defect in the configurable circuit comprises to detect, based on a self-diagnostics test using the aggregated data as input, the defect in the configurable circuit.

Example 19 includes the subject matter of any of Examples 11-18, and wherein the plurality of instructions further causes the vehicle controller to determine whether to perform a complete reconfiguration action or a partial reconfiguration action.

Example 20 includes the subject matter of any of Examples 11-19, and wherein to perform the reconfiguration action comprises to identify a first of the physical logic units associated with the defect, the first physical logic unit being programmed with bitstream data; and reprogramming the bitstream data into a second of the physical logic units different from the first physical logic unit.

Example 21 includes a computer-implemented method comprising aggregating data observed from each of a plurality of sensors in the vehicle controller, the vehicle controller having a configurable circuit including one or more physical logic units; detecting a trigger indicative of a defect in the configurable circuit, the defect identified as a function of the aggregated data; and performing, in response to the trigger, a reconfiguration action on the configurable circuit to repair the defect.

Example 22 includes the subject matter of Example 21, and wherein aggregating the data observed from each of the plurality of sensors comprises receiving data from each of the one or more sensors; and formatting the data for transmission to one or more services.

Example 23 includes the subject matter of any of Examples 21 and 22, and wherein formatting the data for transmission to one or more services comprises formatting the data for transmission to a service, the data being formatted based on permissions specified for the service.

Example 24 includes the subject matter of any of Examples 21-23, and further including transmitting the aggregated data to the one or more services.

Example 25 includes an autonomous driving system comprising a configurable circuit having one or more physical logic units; means for aggregating data observed from each of a plurality of sensors; means for detecting a trigger indicative of a defect in the configurable circuit, the defect identified as a function of the aggregated data; and means for performing, in response to the trigger, a reconfiguration action on the configurable circuit to repair the defect.

The invention claimed is:

1. An apparatus, comprising:
a vehicle controller having a plurality of physical logic devices, the vehicle controller to:
aggregate data observed from each of a plurality of sensors;
perform a self-diagnostic test on the aggregated data;
detect a trigger indicative of a defect in a first physical logic device of the plurality of physical logic devices based on the self-diagnostic test; and
perform, in response to the trigger, a reconfiguration action in the plurality of physical logic devices to activate a second physical logic device of the plurality of physical logic devices.

2. The apparatus of claim 1, wherein to aggregate the data observed from each of the plurality of sensors comprises to:
receive data from each of the plurality of sensors; and
format the data for transmission to one or more services.

3. The apparatus of claim 2, wherein to format the data for transmission to the one or more services comprises to format the data for transmission to a service of the one or more services, the data being formatted based on permissions specified for the service of the one or more services.

4. The apparatus of claim 2, wherein the vehicle controller is further to transmit the aggregated data to the one or more services.

5. The apparatus of claim 4, wherein to transmit the aggregated data comprises to transmit the aggregated data to a service of the one or more services for aggregating the data with data of a plurality of vehicles.

6. The apparatus of claim 4, wherein to transmit the aggregated data comprises to transmit the aggregated data to a service of the one or more services executing on a server of a manufacturer of the apparatus.

7. The apparatus of claim 1, wherein to perform the self-diagnostic test on the aggregated data comprises to detect, based on the self-diagnostic test, the defect in the first physical logic device.

8. The apparatus of claim 1, wherein the vehicle controller is further to determine whether to perform a complete reconfiguration action or a partial reconfiguration action.

9. The apparatus of claim 1, wherein the first physical logic device is programmed with bitstream data, wherein to perform the reconfiguration action comprises to:
reprogram the bitstream data into the second physical logic device.

10. One or more non-transitory machine-readable storage media comprising a plurality of instructions, which, when executed by a vehicle controller having one or more processors and a plurality of physical logic devices, causes the vehicle controller to:
aggregate data observed from each of a plurality of sensors in the vehicle controller;
perform a self-diagnostic test on the aggregated data;
detect a trigger indicative of a defect in a first physical logic device of the plurality of physical logic devices based on the self-diagnostic test; and
perform, in response to the trigger, a reconfiguration action in the plurality of physical logic devices to activate a second physical logic device of the plurality of physical logic devices.

11. The one or more non-transitory machine-readable storage media of claim 10, wherein to aggregate the data observed from each of the plurality of sensors comprises to:
receive data from each of the plurality of sensors; and
format the data for transmission to one or more services.

12. The one or more non-transitory machine-readable storage media of claim 11, wherein to format the data for transmission to the one or more services comprises to format the data for transmission to a service of the one or more services, the data being formatted based on permissions specified for the service of the one or more services.

13. The one or more non-transitory machine-readable storage media of claim 11, wherein the plurality of instructions further causes the vehicle controller to transmit the aggregated data to the one or more services.

14. The one or more non-transitory machine-readable storage media of claim 13, wherein to transmit the aggregated data comprises to transmit the aggregated data to a service of the one or more services for aggregating the data with data of a plurality of vehicles.

15. The one or more non-transitory machine-readable storage media of claim 13, wherein to transmit the aggregated data comprises to transmit the aggregated data to a service of the one or more services executing on a server of a manufacturer of the vehicle controller.

16. The one or more non-transitory machine-readable storage media of claim 10, wherein to perform the self-diagnostic test on the aggregated data comprises to detect, based on the self-diagnostic test, the defect in the first physical logic device.

17. The one or more non-transitory machine-readable storage media of claim 10, wherein to perform the reconfiguration action comprises to:
reprogram bitstream data of the first physical logic device into the second physical logic device.

18. A computer-implemented method comprising:
aggregating data observed from each of a plurality of sensors in a vehicle controller, the vehicle controller having a plurality of physical logic devices;
performing a self-diagnostic test on the aggregated data;
detecting a trigger indicative of a defect in a first physical logic device of the plurality of physical logic devices based on the self-diagnostic test; and
performing, in response to the trigger, a reconfiguration action in the plurality of physical logic devices to activate a second physical logic device of the plurality of physical logic devices.

19. The computer-implemented method of claim 18, wherein aggregating the data observed from each of the plurality of sensors comprises:
receiving data from each of the plurality of sensors; and
formatting the data for transmission to one or more services.

20. The computer-implemented method of claim 18, wherein performing the self-diagnostic test on the aggregated data comprises detecting, based on the self-diagnostic test, the defect in the first physical logic device.

* * * * *